US010701628B2

(12) United States Patent
Stojanovski et al.

(10) Patent No.: US 10,701,628 B2
(45) Date of Patent: Jun. 30, 2020

(54) USER EQUIPMENT CONTROLLED MOBILITY IN AN EVOLVED RADIO ACCESS NETWORK

(71) Applicant: Intel IP Corporation, Santa Clara, CA (US)

(72) Inventors: Alexandre S. Stojanovski, Paris (FR); Ana Lucia A. Pinheiro, Hillsboro, OR (US); Richard C. Burbidge, Shrivenham (GB); Candy Yiu, Portland, OR (US); Youn Hyoung Heo, Seoul (KR); Sangeetha L. Bangolae, Houston, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/454,546

(22) Filed: Jun. 27, 2019

(65) Prior Publication Data

US 2019/0387466 A1 Dec. 19, 2019

Related U.S. Application Data

(62) Division of application No. 15/542,262, filed as application No. PCT/US2015/066000 on Dec. 16, 2015, now Pat. No. 10,397,860.

(Continued)

(51) Int. Cl.
*H04W 48/20* (2009.01)
*H04W 60/04* (2009.01)
(Continued)

(52) U.S. Cl.
CPC ........... *H04W 48/20* (2013.01); *H04W 48/16* (2013.01); *H04W 60/04* (2013.01); *H04W 28/18* (2013.01);
(Continued)

(58) Field of Classification Search
None
See application file for complete search history.

(56) References Cited

U.S. PATENT DOCUMENTS

2004/0095905 A1\* 5/2004 Pecen ..................... H04L 47/14
370/331
2004/0097233 A1\* 5/2004 Pecen ..................... H04L 47/10
455/437

(Continued)

FOREIGN PATENT DOCUMENTS

CN 1874592 12/2006
CN 101005692 7/2007
(Continued)

*Primary Examiner* — Fayyaz Alam
(74) *Attorney, Agent, or Firm* — Fay Kaplun & Marcin, LLP

(57) ABSTRACT

Briefly, in accordance with one or more embodiments, a user equipment (UE) may enter into an E-UTRAN Routing Area Paging Channel state, and is configured with an E-UTRAN Routing Area and an Anchor identifier to identify an anchor evolved Node B (eNB) for the UE. The UE selects to a new cell without performing a handover procedure, and performs a cell update procedure. The UE also may enter into a Cell Update Connected state, and is configured with an Anchor identifier. The UE selects to a new cell, performs a cell update procedure, performs a buffer request procedure, and performs a cell update procedure to download buffered data and to perform data transmission with the new cell.

15 Claims, 10 Drawing Sheets

Related U.S. Application Data

(60) Provisional application No. 62/145,370, filed on Apr. 9, 2015.

(51) Int. Cl.
*H04W 48/16* (2009.01)
*H04W 36/00* (2009.01)
*H04W 28/18* (2009.01)
*H04W 88/06* (2009.01)

(52) U.S. Cl.
CPC ........ *H04W 36/0079* (2018.08); *H04W 88/06* (2013.01)

(56) References Cited

U.S. PATENT DOCUMENTS

| | | | | |
|---|---|---|---|---|
| 2007/0218911 A1* | 9/2007 | Islam | ................... | H04W 60/04 455/445 |
| 2008/0253332 A1* | 10/2008 | Ore | ..................... | H04J 11/0069 370/331 |
| 2008/0305797 A1 | 12/2008 | Somasundaram et al. | | |
| 2009/0086671 A1* | 4/2009 | Pelletier | ............ | H04W 74/0833 370/329 |
| 2009/0168728 A1* | 7/2009 | Pani | ........................ | H04W 8/26 370/332 |
| 2013/0324114 A1* | 12/2013 | Raghothaman | ....... | H04W 8/005 455/426.1 |
| 2014/0092866 A1* | 4/2014 | Teyeb | ................... | H04W 36/24 370/331 |

FOREIGN PATENT DOCUMENTS

| | | |
|---|---|---|
| CN | 102118801 | 7/2011 |
| WO | 03/0471149 | 6/2003 |
| WO | WO-2014104958 A1 * | 7/2014 ........... H04L 1/1812 |

* cited by examiner

USER EQUIPMENT CONTROLLED MOBILITY IN AN EVOLVED RADIO ACCESS NETWORK

CROSS-REFERENCE TO RELATED APPLICATIONS

This application is a divisional under 35 U.S.C. § 121 of and claims priority under 35 U.S.C. § 120 to U.S. patent application Ser. No. 15/542,262, filed Jul. 7, 2017, entitled USER EQUIPMENT CONTROLLED MOBILITY IN AN EVOLVED RADIO ACCESS NETWORK which in turn claims priority under 35 U.S.C. § 371 to International Application No. PCT/US2015/066000 filed Dec. 16, 2015, entitled USER EQUIPMENT CONTROLLED MOBILITY IN AN EVOLVED RADIO ACCESS NETWORK which in turn claims the benefit of U.S. Provisional Application No. 62/145,370 filed Apr. 9, 2015. Said application Ser. No. 15/542,262, PCT/US2015/066000 and 62/145,370 are hereby incorporated herein by reference in their entirety.

BACKGROUND

The Internet of Things (IoT) refers to a collection of sensors having network connectivity to allow the distributed collection and exchange of data. Massive deployment of a large number of IoT devices to connect to existing wireless wide area networks (WWANs) operating in accordance with a Third Generation Partnership Project (3GPP) may present new problems that should be addressed. Evolved Packet Core (EPC) signaling may experience overload due to frequent state changes between the two current network states, the connected state (EMM_Connected) and and the idle state (EMM_Idle). Furthermore, many IoT devices are not connected to power, and therefore should operate with very efficient battery usage. In addition, IoT devices may transmit smaller bursts of data at more frequent intervals, the delay for uplink transmissions should be very low delays. Although some of these issues may be addressed under current architectures, the issues are not all addressed simultaneously.

One approach may be to keep the IoT user equipment (UE) permanently in a connected state such as in EMM_Connected or RRC_CONNECTED, in order to address the signaling load due to state transitions and provide low uplink delays. This approach, however, would have a huge impact on battery life because the UE continuously performs measurements to support the Handover procedure, and because radio interface signaling involves performing the handover at every cell change. Also, while the EPC signaling load due to state transitions is reduced, a different type of EPC signaling load, due to frequent handovers, may be created.

The impact on battery life due to a permanent RRC_CONNECTED state may be somewhat mitigated by using longer values for Connected mode discontinuous reception (DRX) cycle (C-DRX cycle), but this approach is likely to degrade the handover performance. Namely, in cases where the UE is moving very fast, the likelihood of handover failure increases because the serving cell signal becomes weaker as the target cell signal gets stronger, and hence the handover (HO) command sent by the serving cell may not successfully be received. The use of a longer C-DRX cycle will only increase the handover failure rate because in the interest of power saving, the UE performs measurements only during the receiving occasion of the C-DRX cycle and hence a longer C-DRX cycle results in less frequent measurements.

In the case of a handover failure, the UE will declare radio link failure (RLF) and more signaling will be involved. The case of radio link failure (RLF) indicates that the UE performs an RRC connection reestablishment, which involves at least three messages over the air interface, and additionally there may be a delay to declare radio link failure during handover such as delay from expiry of the RLF timer. Moreover, subsequent to RLF, the UE has control over selecting the new cell, which means the network has no control over cell selection.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
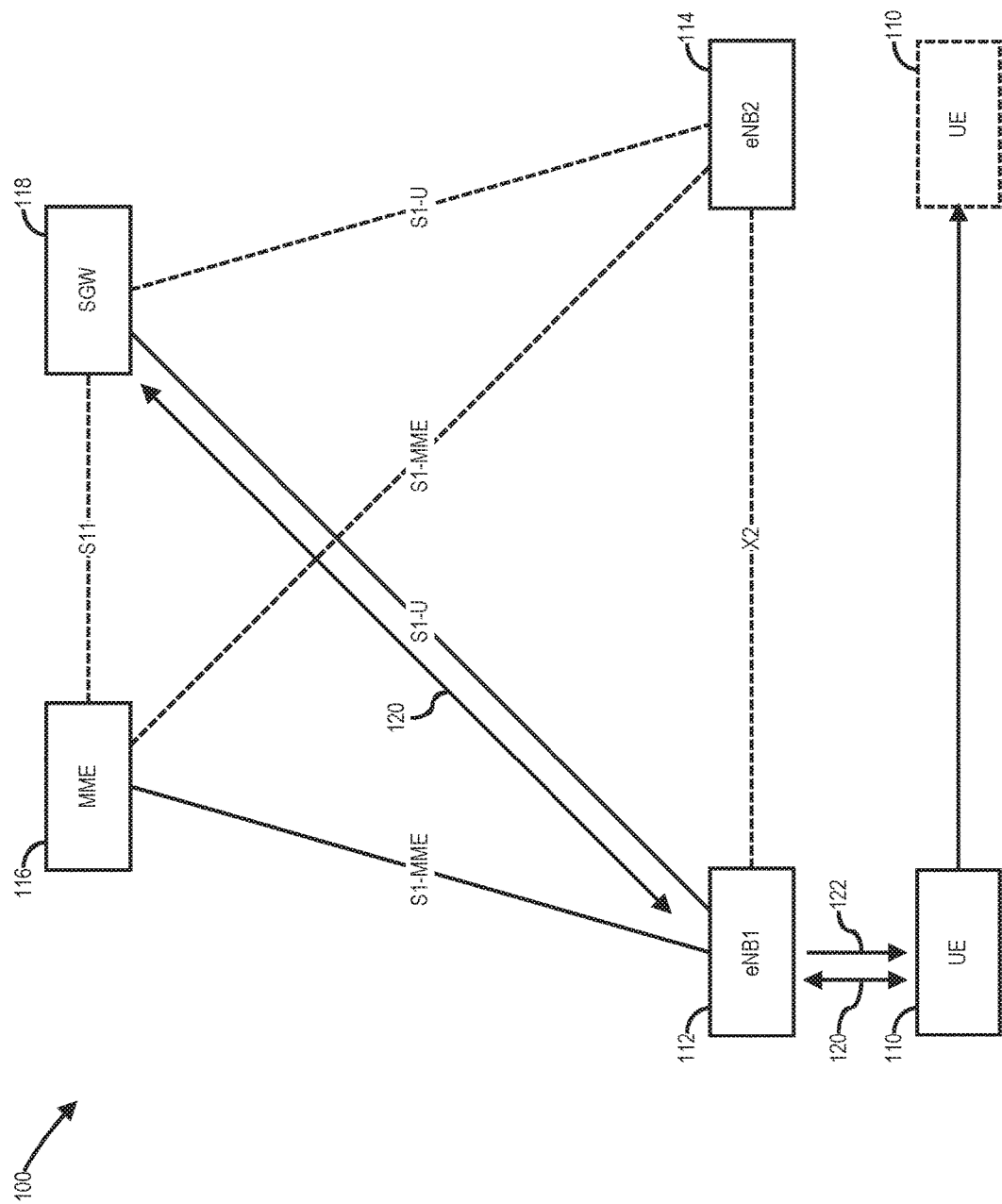
FIG. 1 is a diagram of a network illustrating mobility handling in a first access stratum state using X2 paging and cell update procedures in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Figure 2:
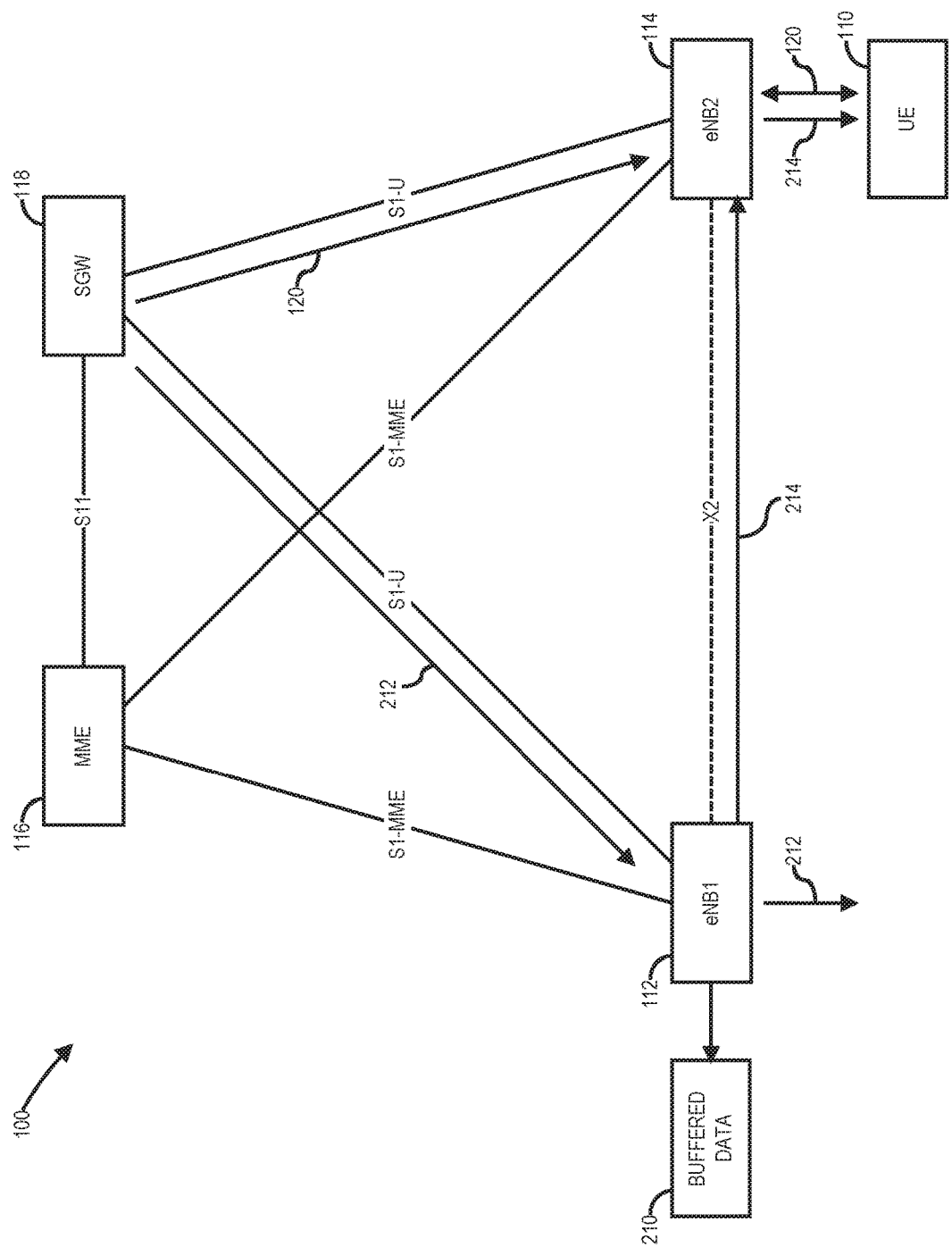
FIG. 2 is a diagram of a network further illustrating mobility handling in the first access stratum state as shown in FIG. 1 in accordance with one or more embodiments.

Referring now to FIG. 1 and FIG. 2, diagrams of a network illustrating mobility handling in a first access stratum state using X2 paging and cell update procedures in accordance with one or more embodiments will be discussed. It should be noted that the embodiments and examples discussed herein may be directed to a network and devices operating in accordance with a Third Generation Partnership Project (3GPP). Furthermore, the embodiments and examples discussed herein also may apply to a new radio access technology that has radio access network architecture similar to an Evolved Universal Mobile Telecommunications System Terrestrial Radio Access Network (E-UTRAN) in accordance with a 3GPP standard and beyond such as a Fifth Generation (5G) network and beyond, and the scope of the claimed subject matter is not limited in these respects. As discussed herein, two new access stratum states are described to implement a user equipment (UE) controlled mobility procedure referred to as Cell Update mobility. The first access stratum state may be referred to as evolved universal mobile telecommunications system (UMTS) terrestrial radio access (E-UTRAN) Routing Area Paging Cannel (ERA_PCH), and the second access stratum state may be referred to as Cell Update Connected (CU_CNCTD). In one or more embodiments, the ERA_PCH state and the Cell Update procedure bear some similarities with the UTRAN URA_PCH state and Cell/ URA Update procedures as described in 3GPP Technical Standard (TS) 25.331 with some differences. The similarities primarily may include the following. When in ERA_PCH state, the UE is in EMM_Connected state. When in the ERA_PCH state, the UE is in PMM Connected state. ERA is a collection of E-UTRAN cells, and URA is collection of UTRAN cells. When downlink data arrives, the UE is paged in the whole ERA. The UE uses the ERA Update procedure when it reselects to a cell belonging to a new ERA. The URA Update used when reselecting to a new URA.

In one or more embodiments, the CU_CNCTD state has some similarities with the UTRAN CELL_FACH state with the following differences. The proposed Cell Update mobility for both ERA_PCH and CU_CNCTD state is adapted to the distributed E-UTRAN architecture. Notably, it is complemented with X2 functionality for paging and data forwarding, in order to avoid frequent S1 path switch. With the CU_CNCTD state, signaling is added to minimize any wastage of resources attempting to deliver data in the source cell if the UE has already imitated its change to a different cell. It should be noted that the ERA_PCH state and the CU_CNCTD states as described herein may be independent access stratum states in some embodiments, and in other embodiments the ERA_PCH state may be a sub-state of an existing idle ERA_PCH mode and the CU_CNCTD state may be a sub-state of an existing connected CU_CNCTD mode in accordance with a 3GPP standard, and the scope of the claimed subject matter is not limited in these respects.

In one or more embodiments, mobility handling in the ERA_PCH state is shown in FIG. 1. Network 100 may include a mobility management entity (MME) 116 and a serving gateway (SGW) 118 wherein data transmissions 120 to and from UE 110 via eNB1 112 may occur. In network 100, the UE 110 initially may be in an HO_CNCTD or CU_CNCTD state and has ongoing uplink and downlink data transmissions 120 via eNB1 112. The ERA_PCH state may be entered when eNB1 realizes that the UE 110 has been inactive for a long period of time. The decision also may be based on mobility, allowing for fast moving UEs to move around without having to perform cell update multiple times. The eNB1 112 becomes the Anchor eNB for this UE 110 and serves as the S1 termination point. As part of the state change, a parameter referred to as Anchor ID may be provided to the UE 110. This parameter may be used to identify the Anchor eNB such as eNB1 112 when UE 110 resurfaces under another eNB such as eNB2 114. The eNB1 112 transmits an ERA_PCH command 122 to UE 110. The definition of the E-UTRAN Routing Area (ERA) may be defined either as an ERA identifier (ERA ID), a list of ERA IDs, or as a list of cells. In the case that ERA IDs are used, then it may be assumed that each cell will broadcast via system information an ERA ID so that the ERA ID can be known by all UEs located in the cell. The UE 110 now can move within all cells belonging to the same ERA without having to perform any signaling.

As shown in FIG. 2, if network 100 has downlink data to send to the UE 110, the data are forwarded to the Anchor eNB, in this example eNB1 112, and are buffered there in buffer 210. The Anchor eNB, eNB1 112, knows that the UE 110 has entered the ERA_PCH state, and thus the location of UE 110 will be determined. Locating UE 110 may done by sending a paging message 212 on the radio in the cell, eNB1 112, where the UE 110 was last active. If eNB1 112 does not receive a response, or in parallel with the previous, eNB1 112 sends an X2 PAGING message 214 to all other eNBs, such as to eNB2 114, controlling cells that belong to the same ERA provided to the UE 110. It may be assumed that the Anchor eNB, eNB1 112, is able to reach via X2 all eNBs that control cells belonging to the same ERA.

The UE 110 may perform a Cell Update procedure with eNB2 114 in response to receiving the X2 paging message 214. The Cell Update message includes the Anchor ID allowing eNB2 114 to identify the Anchor eNB, eNB1 112.

As a result, eNB2 114 fetches UE context from eNB1 112, and eNB1 112 may forward the buffered data in buffer 210 to eNB2 114, which in turn forwards the buffered data and the UE context to the UE 110. Note that at this point network 100 may decide to keep eNB1 112 as the Anchor eNB, for example in order to reduce S1 signaling load, or to re-anchor the S1 interface in eNB2 114. In the latter case, a new Anchor ID is provided to UE 110 as part of the Cell Update procedure. At this point, UE 110 may be placed by the eNB2 114, or possibly based on implicit rules, in the CU_CNCTD state or HO_CNCTD state. At a later time, after some period of inactivity, the UE 110 may again be placed in the ERA_PCH state.

In one more embodiments, eNB2 114 becomes the new Anchor eNB for UE 110 after UE 110 has performed a Cell Update procedure to connect with eNB2 114. The description, above, was related to downlink data in ERA_PCH state. If UE 110 has uplink data to transmit while in ERA_PCH state, the UE 110 performs the Cell Update procedure as described, above, with the only difference being that the Cell Update procedure is not triggered by paging. Even when there is no uplink or downlink data to transmit, the UE 110 can still perform the Cell Update procedure, for example when moving to a cell that does not belong to the current ERA. In this case, the Cell Update procedure may be referred to as an ERA Update procedure, although from a signaling perspective ERA Update may be based on the same messages as Cell Update. After the ERA Update procedure is completed the UE 110 may immediately return to ERA_PCH state. As can be seen from the description so far, the handling of ERA_PCH state may be similar to the handling of URA_PCH in UMTS. The main difference, however, is that in with the ERA_PCH in accordance with one or more embodiments, there is no central radio access network (RAN) node comparable to a radio network controller (RNC). As a result, in one or more embodiments the UE 110 is notified of the Anchor ID and signals the Anchor ID as part of the Cell Update procedure. Furthermore, in one or more embodiments the distributed E-UTRAN architecture discussed herein also utilizes the X2 PAGING message as part of the Cell Update procedure, although the scope of the claimed subject matter is not limited in these respects.

Figure 3:
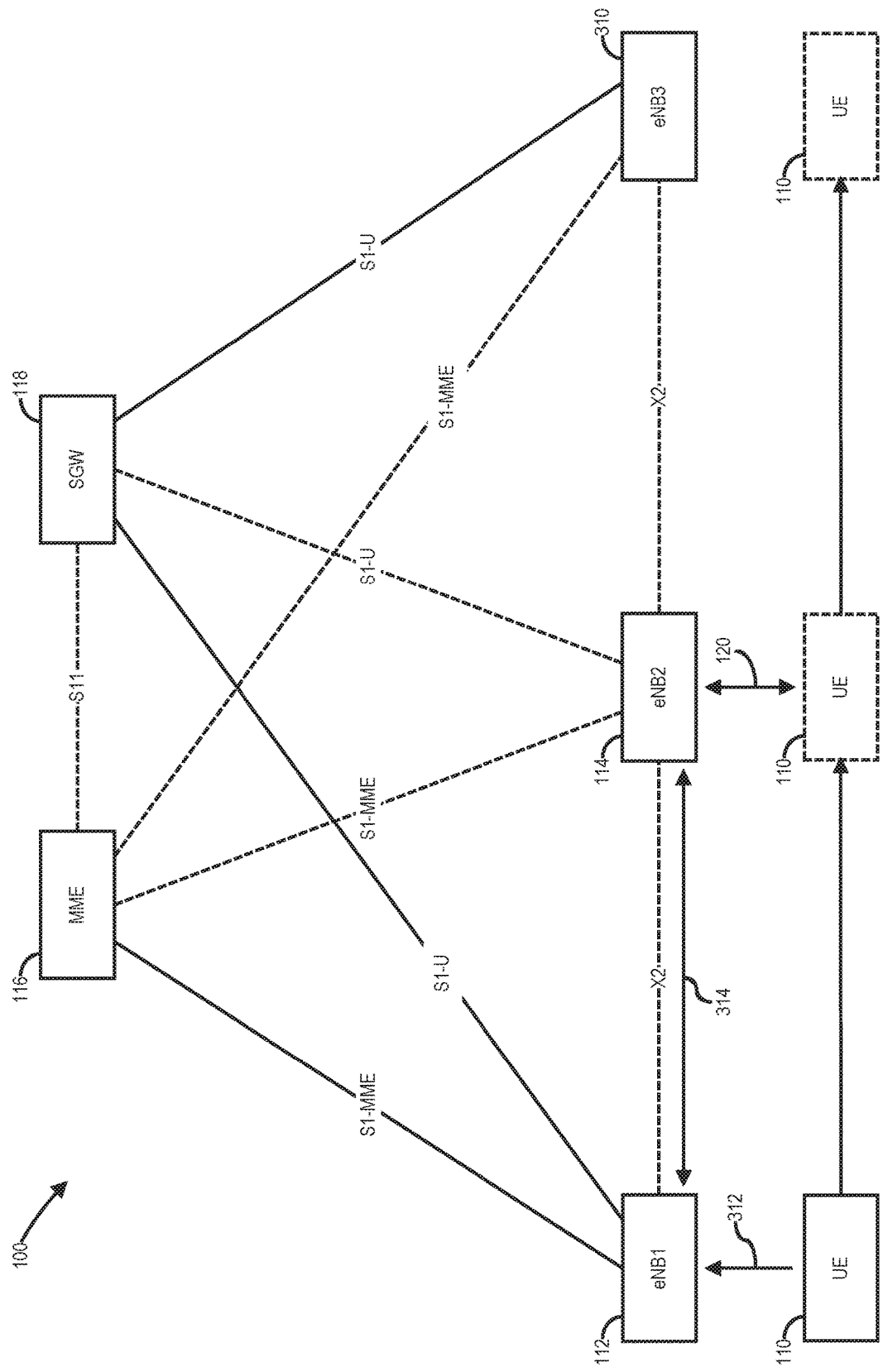
FIG. 3 is a diagram of a network illustrating mobility handling in a second access stratum state using buffer request and cell update procedures in accordance with one or more embodiments.

Referring now to FIG. 3, a diagram of a network illustrating mobility handling in a second access stratum state using buffer request and cell update procedures in accordance with one or more embodiments will be discussed. FIG. 3 shows mobility handling in the CU_CNCTD state. Initially, the UE 110 is in the CU_CNCTD state and may have ongoing uplink and downlink data transmissions via eNB1 112, which is designated as the Anchor eNB. The UE 110 has an Anchor ID for eNB1 112 which may have been provided to the UE 110 for example when the UE 110 was placed in the CU_CNCTD state. The UE 110 then realizes that it is moving away from the cell and sends a Buffer Request message 312 to eNB1 112 in order to suspend transmission of downlink data. Generally, the Buffer Request message is used for the UE 110 to notify source eNB that the UE 110 will change the serving cell using the Cell Update procedure. This message may be defined as radio resource control (RRC) signaling, media access control (MAC) control element signaling or physical layer signaling.

Next, the UE 110 selects or reselects to a cell controlled by eNB2 114 and performs a Cell Update procedure indicating the Anchor ID for the UE 110. Based on the Anchor ID, eNB2 114 contacts eNB1 112, and fetches UE context in order to resume data transmissions via eNB2 114. As in the ERA_PCH case, above, network 100 may decide to keep eNB1 112 as the Anchor eNB, or to perform a path switch procedure in order to re-anchor the S1 interface on eNB2 114, in which case a new Anchor ID is provided to UE 110 as part of the Cell Update procedure. In the former case, eNB1 112 and eNB2 114 will establish a user plane path 314 over the X2 interface so that the complete user plane path is S-GW 118, eNB1 112, eNB2 114, and UE 110. Both uplink and downlink data transmissions 120 can use this user plane path 314. The benefit of establishing such a path over X2 is to avoid the impact of EPC signaling associated with performing a path switch at every cell change. The network 100 (or E-UTRAN) may at a later time decide to perform the path switch in order to re-anchor the S1 interface to eNB2 114, thereby creating a more direct path from S-GW 118 to eNB2 114 to UE 110. The network 100 (or E-UTRAN) may decide to perform such a path switch based on, for example, the volume of data being transferred. As part of the re-anchoring procedure, the new Anchor ID may be provided to the UE 110 using an RRC procedure.

In some embodiments, the UE 110 may move out of the source cell without being able to send a Buffer Request message 312. One such example is the case where UE 110 moves out of the source cell while in the sleep period of Connected DRX (C-DRX) mode. Having awoken from sleep, the UE 110 may select or re-select a different cell and may perform a Cell Update procedure in the target cell. The target eNB then contacts the source eNB and fetches the UE context. If the S1 interface is not re-anchored to eNB2 114, then the data in eNB1 112 that is not yet successfully delivered to the source cell may be sent via the newly created X2 path. If the S1 interface is re-anchored to eNB21 114 using a path switch, then any not yet successfully delivered data may be forwarded to eNB2 114 using the normal procedures for path switch. As no Buffer Request was received by the source eNB, some resources of the source cell may have been wasted by the source cell unsuccessfully attempting to deliver downlink data to the UE 110 while the UE 110 is in the process of selecting or reselecting to a different cell and performing the Cell Update procedure in that cell. This procedure, however, still may be better than the existing procedure where the UE 110 would have to declare Radio Link Failure (RLF) and then re-establish the radio resource control (RRC) connection in the new cell.

Thus, in one or more embodiments, as illustrated in the above examples, mobility handling may be as follows. Two new RRC states in the access stratum are defined: E-UTRAN Routing Area Paging Channel (ERA_PCH) and Cell Update Connected (CU_CNCTD). A UE 110 can be in the ERA_PCH state or the CU_CNCTD state, or a state which is equivalent to the existing behavior in RRC_CONNECTED mode where handover is used for cell changes. In one or more embodiments, the existing behavior in the RRC_CONNECTED may be referred to as Handover Connected (HO_CNCTD). A network or E-UTRAN may choose to implement the ERA_PCH state or the CU_CNCTD state or both. The HO_CNCTD state also may be available the E-UTRAN as it is the existing behavior. Both new RRC states correspond to the EMM_Connected state in the Non Access Stratum (NAS) and RRC_CONNECTED in the Access Stratum (AS). Configuration and/or transition of states may be done explicitly by the eNB or may be done implicitly based on the predefined or preconfigured rules. The MME 116 may also play a role in configuring the use of the new RRC states.

In one or more embodiments, ERA_PCH is a substrate of the RRC_CONNECTED state. Characteristics of the ERA_PCH state are as follows. When in ERA_PCH, the UE location is known with the granularity of an ERA, wherein ERA comprises a collection of E-UTRAN cells. UE based mobility is used wherein the UE 110 performs cell selection and reselection in order to determine the best cell on which to camp. The UE 110 can move freely between cells of the same ERA without any signaling with the network. Downlink (DL) and uplink (UL) data transfer with the UE may not be possible until a Cell Update procedure has been performed. Upon arrival of downlink data, the UE 110 is paged in the whole ERA. The UE 110 responds with Cell Update. When selecting or reselecting to a cell belonging to another ERA, the UE 110 performs an ERA Update procedure. The ERA_PCH state may be considered as similar to URA_PCH in UMTS.

Furthermore, in one or more embodiments, the CU_CNCTD also may be considered as a substrate of the RRC_CONNECTED state. When in the CU-CNCTD state, the UE 110 location is known with cell level granularity. UE based mobility is used wherein the UE 110 performs cell selection and reselection in order to determine the best cell on which to camp. The Cell Update procedure may be used to inform the network 100 or E-UTRAN whenever the UE 110 changes to a new cell. DL and UL data transfer with the UE is then possible. Before leaving the source cell in the CU_CNCTD state, the UE 110 may send a Buffer Request message to request that the eNB buffers any downlink data that arrives at the eNB for the UE 110, instead of attempting to deliver the data over the radio interface. After successful selection or reselection, the UE 110 uses the Cell Update procedure from the target cell to resume the transmission of downlink data.

In one or more embodiments, the proposed Cell Update mobility may be applied to a distributed E-UTRAN architecture, for example an E-UTRAN comprising only eNBs, or to a centralized E-UTRAN architecture by introducing an eNB gateway (eNB GW) as a centralized node on network 100, for example eNB GW 410 as shown in and described with respect to FIG. 4 through FIG. 7, below. In the distributed architecture, there is a notion of an Anchor eNB which is an eNB that terminates the S1 interface. The Anchor eNB may be different from the current serving eNB of the UE 110. For a UE 110 in the ERA_PCH state, downlink data may be buffered at the Anchor eNB, and the UE 110 is paged in the whole ERA by using an X2 Paging procedure towards all eNBs related to the ERA. For a UE 110 in CU_CNCTD state, when the UE 110 resurfaces under a new cell that is not controlled by the Anchor eNB, network 100 may decide to re-anchor S1 on the new eNB, or delay re-anchoring in order to minimize S1 signaling. An Anchor ID may be provided to the UE 110 so that the Anchor ID may be included in the Cell Update procedure message to enable locating of the Anchor eNB. For a UE 110 in the ERA_PCH state, when the UE 110 resurfaces under a new ERA using the ERA Update procedure, the S1 interface typically may be re-anchored immediately.

In one or more embodiments, the ERA_PCH state may be similar to URA_PCH in UMTS. When in ERA_PCH, the UE 110 location is known with the granularity of an ERA, the ERA being a collection of E-UTRAN cells. The UE 110 can move freely between cells of the same ERA without any signaling with network 100. Upon arrival of downlink data, the UE 110 is paged in the whole ERA. When selecting or reselecting to a cell belonging to another ERA, the UE 110 performs an ERA Update procedure. It should be noted that the ERA Update procedure may be similar to the Cell Update procedure, with an appropriate cause value set to Triggered due to change of ERA. Furthermore, in one or more embodiments the CU_CNCTD state may be similar to an existing RRC_CONNECTED state in the sense that the UE 110 location is known with cell granularity, and there is an established RRC connection. In contrast to existing behavior in RRC_CONNECTED, in accordance with one or more embodiments the mobility may be UE-driven, that is based on cell selection or reselection, and may use a Cell Update procedure without using a network-controlled Handover procedure.

The ERA_PCH state and/or the CU_CNCTD state may be entered when network 100 determines that this type of mobility is suited for the UE 110. Such a decision can be made based at least in part on the following factors. The UE 110 subscription may indicate that the ERA_PCH state and/or the CU_CNCTD state is the preferred mobility handling. Network 100 may determine that the ERA_PCH state and/or the CU_CNCTD state should be utilized based at least in part on behavior of the UE 110, for example if the UE 110 sends sporadic data and/or prefers longer values for Connected mode DRX. Network 100 that the ERA_PCH state and/or the CU_CNCTD state should be utilized based at least in part on the mobility pattern exhibited by the behavior, for example if the UE 110 is highly mobile. The current state may be configured and/or changed by the eNB for example by an RRC procedure. Alternatively, transition between different modes implicitly may be done. For example if there is ongoing data in the CU_CNCTD state, the UE 110 autonomously may move to the HO_CNCTD state, which means that the UE 110 triggers measurement reporting for the normal handover procedure instead of a Cell Update procedure.

Figure 4:
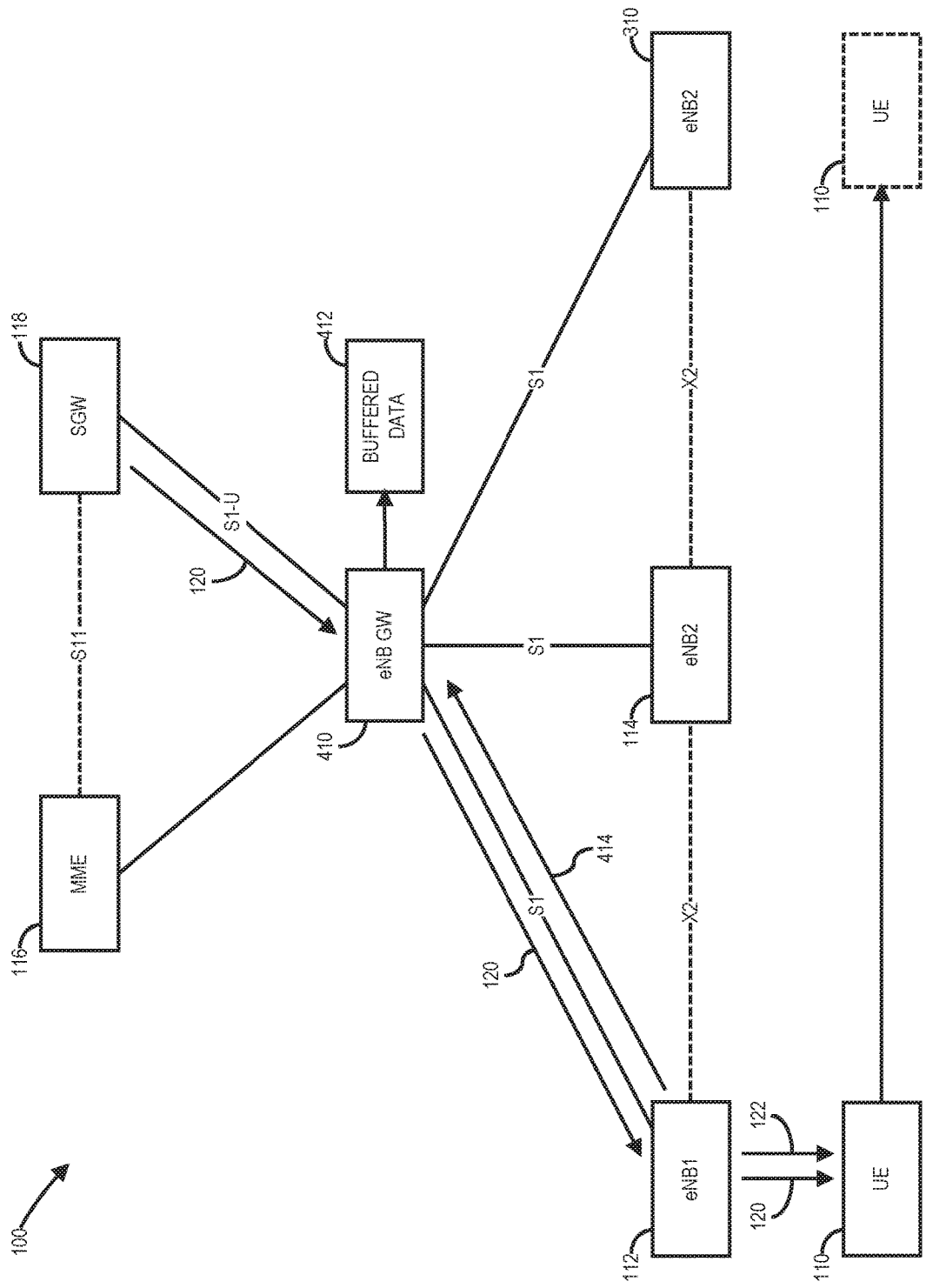
FIG. 4 is a diagram of a network illustrating mobility handling in the first access stratum state using a centralized architecture in accordance with one or more embodiments.
Figure 5:
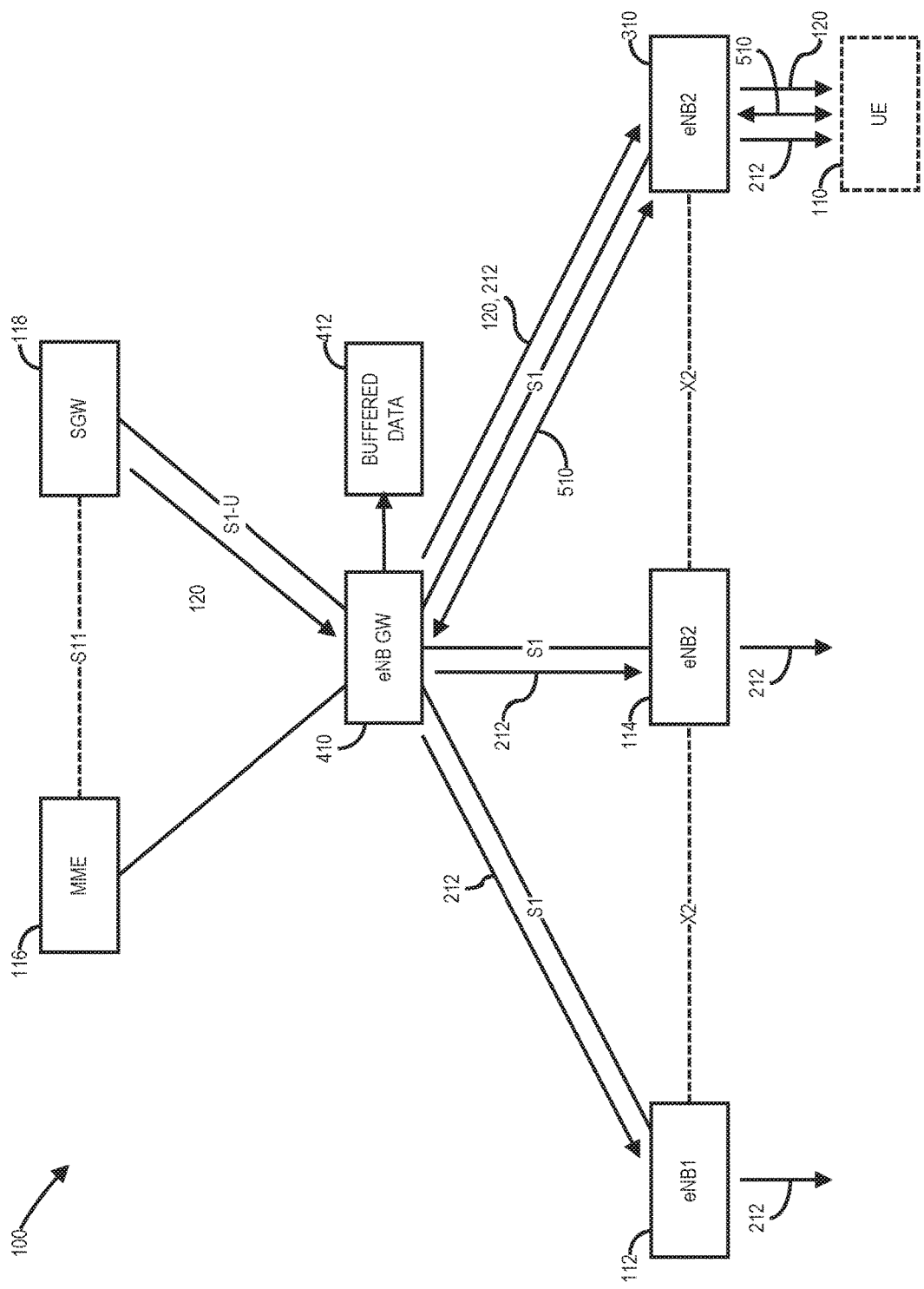
FIG. 5 is a diagram of a network further illustrating mobility handling in the first access stratum state as shown in FIG. 4 in accordance with one or more embodiments.

Referring now to FIG. 4 and FIG. 5, diagrams of a network illustrating mobility handling in the first access stratum state using a centralized architecture in accordance with one or more embodiments will be discussed. FIG. 4 and FIG. 5 show the mobility handling for the ERA_PCH state described herein as applied to a centralized E-UTRAN architecture of network 100. In such an architecture, the eNBs are connected to a central network node referred to as an eNB gateway (eNB GW) 410. The hierarchical location of eNB GW 410 may be similar to the Home eNB GW (HeNB GW), an optional functional node in the existing E-UTRAN architecture, but which, however, implements different functions. The UE 110 may receive download data transmissions 120 from SGW 118 via eNB GW 410 and eNB1 112. The UE 110 may receive a command 122 to enter into the ERA_PCH state. The UE context may be transferred for the ERA_PCH via transmission 414. As shown in FIG. 5, in one or more embodiments, the eNB GW 410 may be utilized for serving as a long-term anchor for the S1 interface towards the EPC, storing of UE context for UEs in the ERA_PCH state, buffering downlink data in buffer 412 for UEs in the ERA_PCH state, sending S1 PAGING messages 212 to eNBs controlling cells of the ERA, and/or temporary buffering for UEs in the CU_CNCTD state upon reception of a Buffer Request. Context and path switch request 510 may transfer buffered data and downloaded data transmissions 120 to eNB3 310. It should be noted that eNB GW 410 may be used as the mobility anchor for both the ERA_PCH as shown in FIG. 4 and FIG. 5, and also for the CU_CNCTD state mobility as shown in and described with respect to FIG. 6 and FIG. 7, below.

Figure 6:
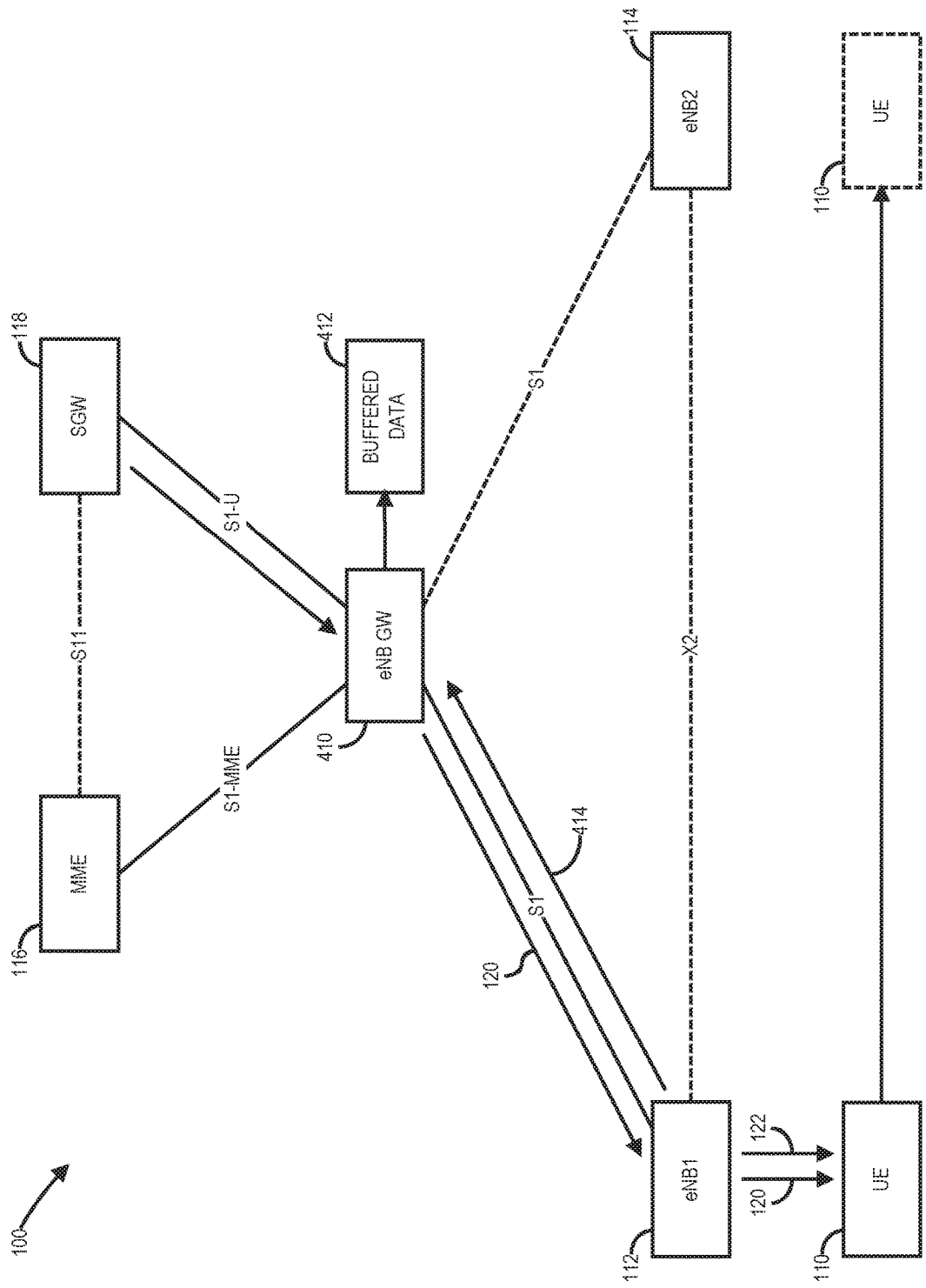
FIG. 6 is a diagram of a network illustrating mobility handling in the second access stratum state using a centralized architecture in accordance with one or more embodiments.
Figure 7:
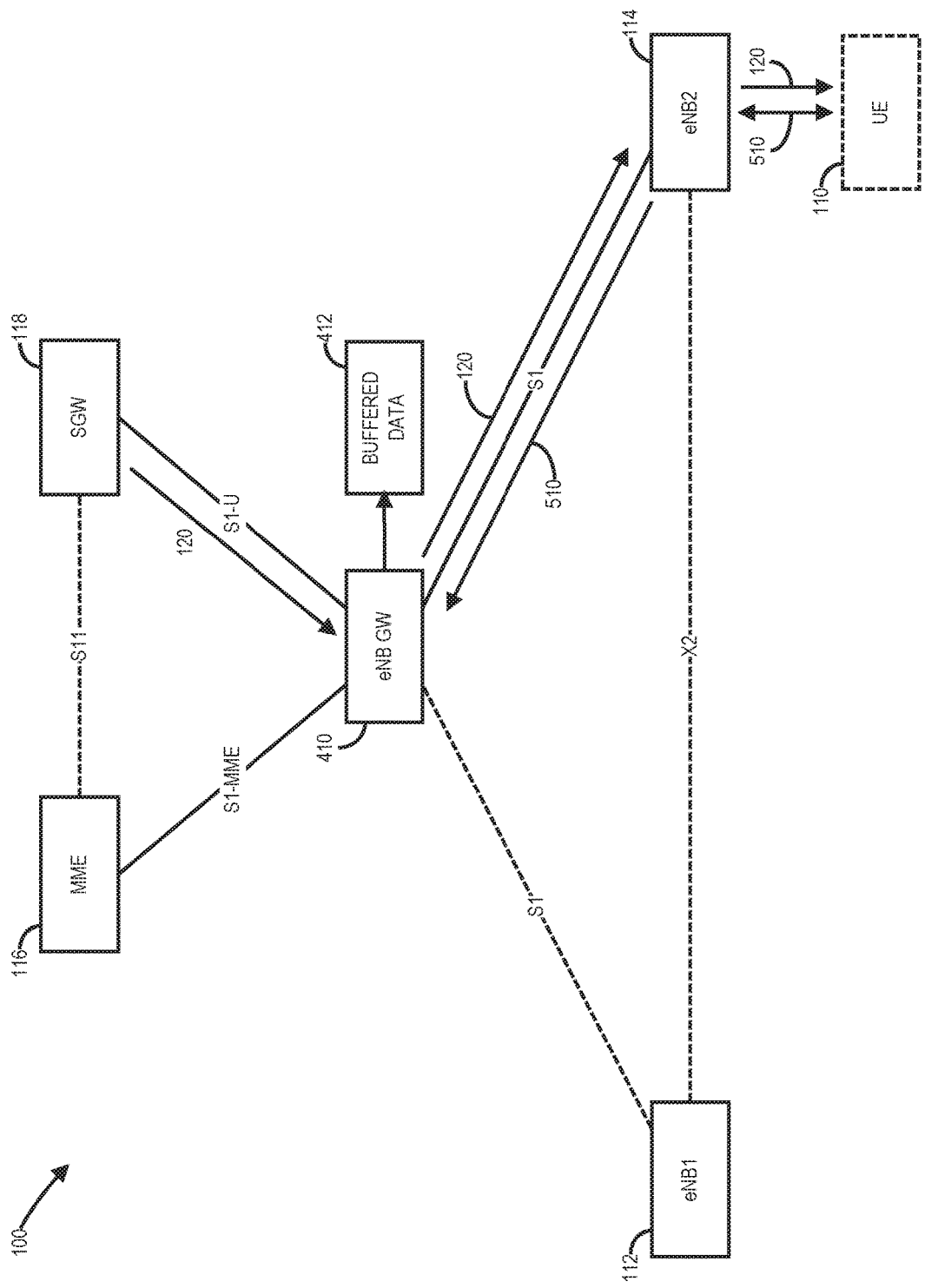
FIG. 7 is a diagram of a network further illustrating mobility handling in the second access stratum state as shown in FIG. 6 in accordance with one or more embodiments.

Referring now to FIG. 6 and FIG. 7, diagrams of a network illustrating mobility handling in the second access stratum state using a centralized architecture in accordance with one or more embodiments will be discussed. As shown in FIG. 6 and FIG. 7, if the UE 110 was unable to send a Buffer Request before leaving the source eNB such as eNB1 112, for example because the UE 110 was in the sleep period of a C-DRX cycle, once the UE 110 performs the Cell Update procedure with the target eNB, such as eNB2 114, any data buffered in the source eNB can be fetched either via X2 from eNB1 112, or via S1 from source eNB, eNB1 112 to eNB GW 410 to target eNB, eNB2 114.

Figure 8:
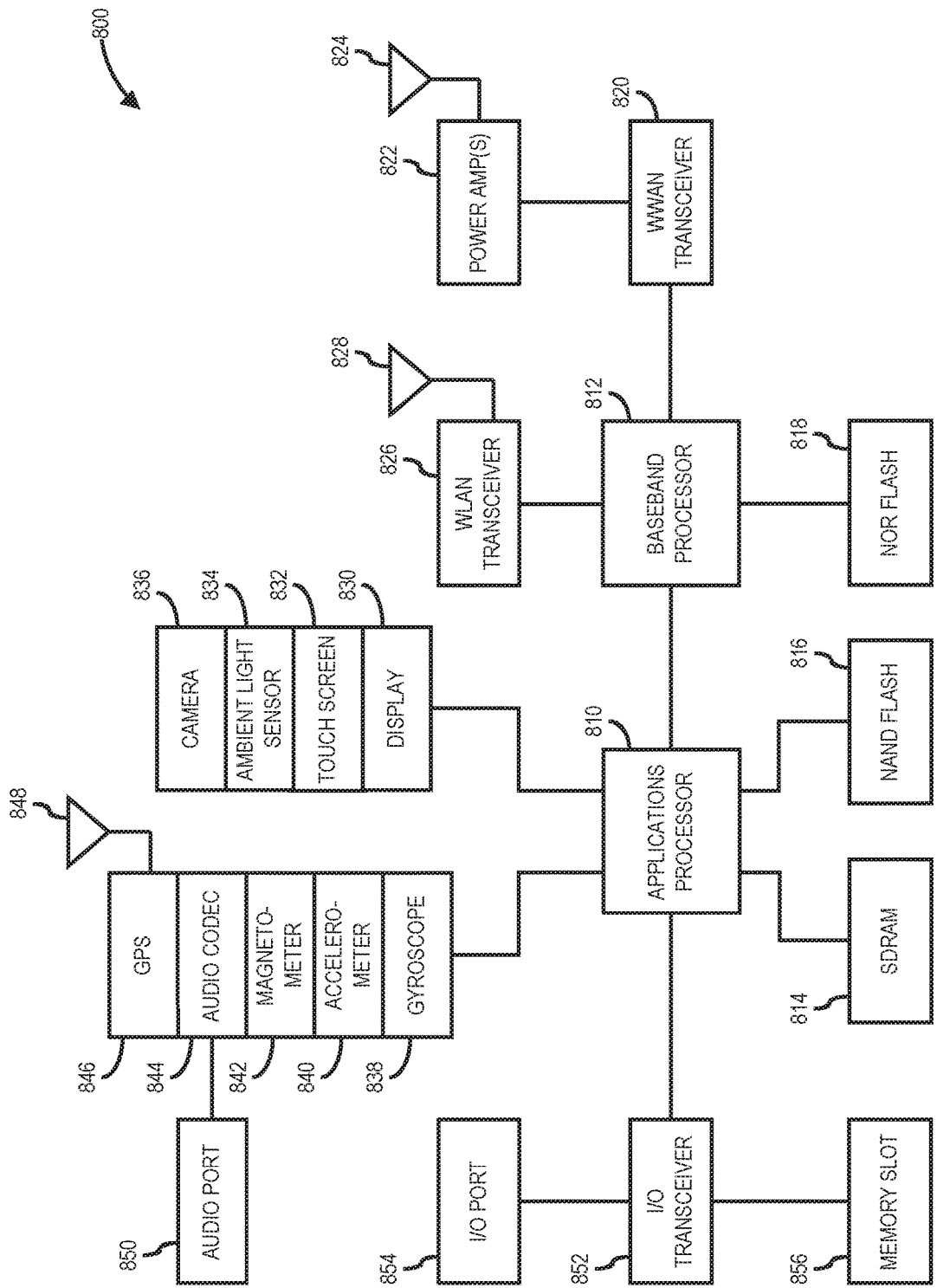
FIG. 8 is a block diagram of an information handling system capable of providing location information for Voice over WLAN emergency calling in accordance with one or more embodiments.

Referring now to FIG. 8, a block diagram of an information handling system capable of user equipment controlled mobility in an evolved radio access network in accordance with one or more embodiments will be discussed. Information handling system 800 of FIG. 8 may tangibly embody any one or more of the network elements described herein, above, including for example the elements of network 100 with greater or fewer components depending on the hardware specifications of the particular device. In one embodiment, information handling system 800 may tangibly embody a user equipment (UE) comprising circuitry to enter into an evolved universal mobile telecommunications system (UMTS) terrestrial radio access (E-UTRAN) Routing Area Paging Channel (ERA_PCH) state, wherein the UE is configured with an E-UTRAN Routing Area (ERA) comprising a collection of cell identifiers, and an Anchor identifier (Anchor ID) to identify an anchor evolved Node B (eNB) for the UE, select to a new cell without performing a handover procedure, and perform a cell update procedure in response to the UE selecting to the new cell, although the scope of the claimed subject matter is not limited in this respect. In another embodiment, information handling system 800 may tangibly embody a user equipment (UE) comprising circuitry to enter into a Cell Update Connected (CU_CNCTD) state, wherein the UE is configured with an Anchor identifier (Anchor ID) to identify an anchor evolved Node B (eNB) for the UE, select to a new cell, perform a cell update procedure in response to the UE selecting to the new cell, perform a buffer request procedure in response to the UE selecting to the new cell, and perform a cell update procedure to download buffered data and to perform data transmission with the new cell, although the scope of the claimed subject matter is not limited in this respect. Although information handling system 800 represents one example of several types of computing platforms, information handling system 800 may include more or fewer elements and/or different arrangements of elements than shown in FIG. 8, and the scope of the claimed subject matter is not limited in these respects.

In one or more embodiments, information handling system 800 may include an application processor 810 and a baseband processor 812. Application processor 810 may be utilized as a general-purpose processor to run applications and the various subsystems for information handling system 800. Application processor 810 may include a single core or alternatively may include multiple processing cores. One or more of the cores may comprise a digital signal processor or digital signal processing (DSP) core. Furthermore, application processor 810 may include a graphics processor or coprocessor disposed on the same chip, or alternatively a graphics processor coupled to application processor 810 may comprise a separate, discrete graphics chip. Application processor 810 may include on board memory such as cache memory, and further may be coupled to external memory devices such as synchronous dynamic random access memory (SDRAM) 814 for storing and/or executing applications during operation, and NAND flash 816 for storing applications and/or data even when information handling system 800 is powered off. In one or more embodiments, instructions to operate or configure the information handling system 800 and/or any of its components or subsystems to operate in a manner as described herein may be stored on an article of manufacture comprising a non-transitory storage medium. In one or more embodiments, the storage medium may comprise any of the memory devices shown in and described herein, although the scope of the claimed subject matter is not limited in this respect. Baseband processor 812 may control the broadband radio functions for information handling system 800. Baseband processor 812 may store code for controlling such broadband radio functions in a NOR flash 818. Baseband processor 812 controls a wireless wide area network (WWAN) transceiver 820 which is used for modulating and/or demodulating broadband network signals, for example for communicating via a 3GPP LTE or LTE-Advanced network or the like.

In general, WWAN transceiver 820 may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 12), 3GPP Rel. 14 (3rd Generation Partnership Project Release 12), 3GPP LTE Extra, LTE Licensed-Assisted Access (LAA), UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, millimeter wave (mm-Wave) standards in general for wireless systems operating at 10-90 GHz and above such as WiGig, IEEE 802.11ad, IEEE 802.11ay, and so on, and/or general telemetry transceivers, and in general any type of RF circuit or RFI sensitive circuit. It should be noted that such standards may evolve over time, and/or new standards may be promulgated, and the scope of the claimed subject matter is not limited in this respect.

The WWAN transceiver 820 couples to one or more power amps 842 respectively coupled to one or more antennas 824 for sending and receiving radio-frequency signals via the WWAN broadband network. The baseband processor 812 also may control a wireless local area network (WLAN) transceiver 826 coupled to one or more suitable antennas 828 and which may be capable of communicating via a Wi-Fi, Bluetooth®, and/or an amplitude modulation (AM) or frequency modulation (FM) radio standard including an IEEE 802.11 a/b/g/n standard or the like. It should be noted that these are merely example implementations for application processor 810 and baseband processor 812, and the scope of the claimed subject matter is not limited in these respects. For example, any one or more of SDRAM 614, NAND flash 816 and/or NOR flash 818 may comprise other types of memory technology such as magnetic memory, chalcogenide memory, phase change memory, or ovonic memory, and the scope of the claimed subject matter is not limited in this respect.

In one or more embodiments, application processor 810 may drive a display 630 for displaying various information or data, and may further receive touch input from a user via a touch screen 832 for example via a finger or a stylus. An ambient light sensor 834 may be utilized to detect an amount of ambient light in which information handling system 800 is operating, for example to control a brightness or contrast value for display 830 as a function of the intensity of ambient light detected by ambient light sensor 834. One or more cameras 836 may be utilized to capture images that are processed by application processor 810 and/or at least temporarily stored in NAND flash 816. Furthermore, application processor may couple to a gyroscope 838, accelerometer 840, magnetometer 842, audio coder/decoder (CODEC) 844, and/or global positioning system (GPS) controller 846 coupled to an appropriate GPS antenna 848, for detection of various environmental properties including location, movement, and/or orientation of information handling system 800. Alternatively, controller 846 may comprise a Global Navigation Satellite System (GNSS) controller. Audio CODEC 844 may be coupled to one or more audio ports 850 to provide microphone input and speaker outputs either via internal devices and/or via external devices coupled to information handling system via the audio ports 850, for example via a headphone and microphone jack. In addition, application processor 810 may couple to one or more input/output (I/O) transceivers 852 to couple to one or more I/O ports 854 such as a universal serial bus (USB) port, a high-definition multimedia interface (HDMI) port, a serial port, and so on. Furthermore, one or more of the I/O transceivers 852 may couple to one or more memory slots 856 for optional removable memory such as secure digital (SD) card or a subscriber identity module (SIM) card, although the scope of the claimed subject matter is not limited in these respects.

Figure 9:
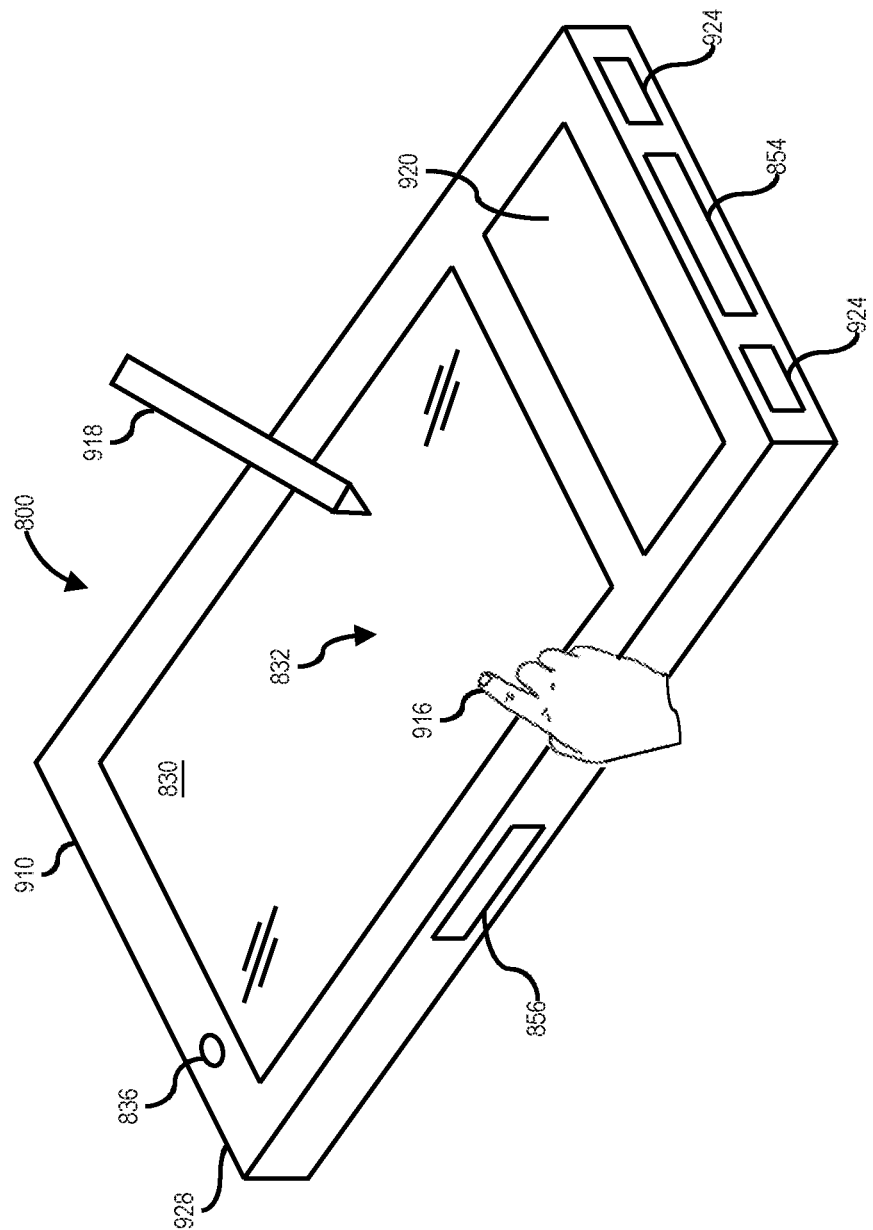
FIG. 9 is an isometric view of an information handling system of FIG. 6 that optionally may include a touch screen in accordance with one or more embodiments.

Referring now to FIG. 9, an isometric view of an information handling system of FIG. 8 that optionally may include a touch screen in accordance with one or more embodiments will be discussed. FIG. 9 shows an example implementation of information handling system 800 of FIG. 8 tangibly embodied as a cellular telephone, smartphone, or tablet type device or the like. The information handling system 800 may comprise a housing 910 having a display 830 which may include a touch screen 832 for receiving tactile input control and commands via a finger 916 of a user and/or a via stylus 918 to control one or more application processors 810. The housing 910 may house one or more components of information handling system 800, for example one or more application processors 810, one or more of SDRAM 814, NAND flash 816, NOR flash 818, baseband processor 812, and/or WWAN transceiver 820. The information handling system 800 further may optionally include a physical actuator area 920 which may comprise a keyboard or buttons for controlling information handling system via one or more buttons or switches. The information handling system 800 may also include a memory port or slot 856 for receiving non-volatile memory such as flash memory, for example in the form of a secure digital (SD) card or a subscriber identity module (SIM) card. Optionally, the information handling system 800 may further include one or more speakers and/or microphones 924 and a connection port 854 for connecting the information handling system 800 to another electronic device, dock, display, battery charger, and so on. In addition, information handling system 800 may include a headphone or speaker jack 928 and one or more cameras 836 on one or more sides of the housing 910. It should be noted that the information handling system 800 of FIG. 9 may include more or fewer elements than shown, in various arrangements, and the scope of the claimed subject matter is not limited in this respect.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 10:
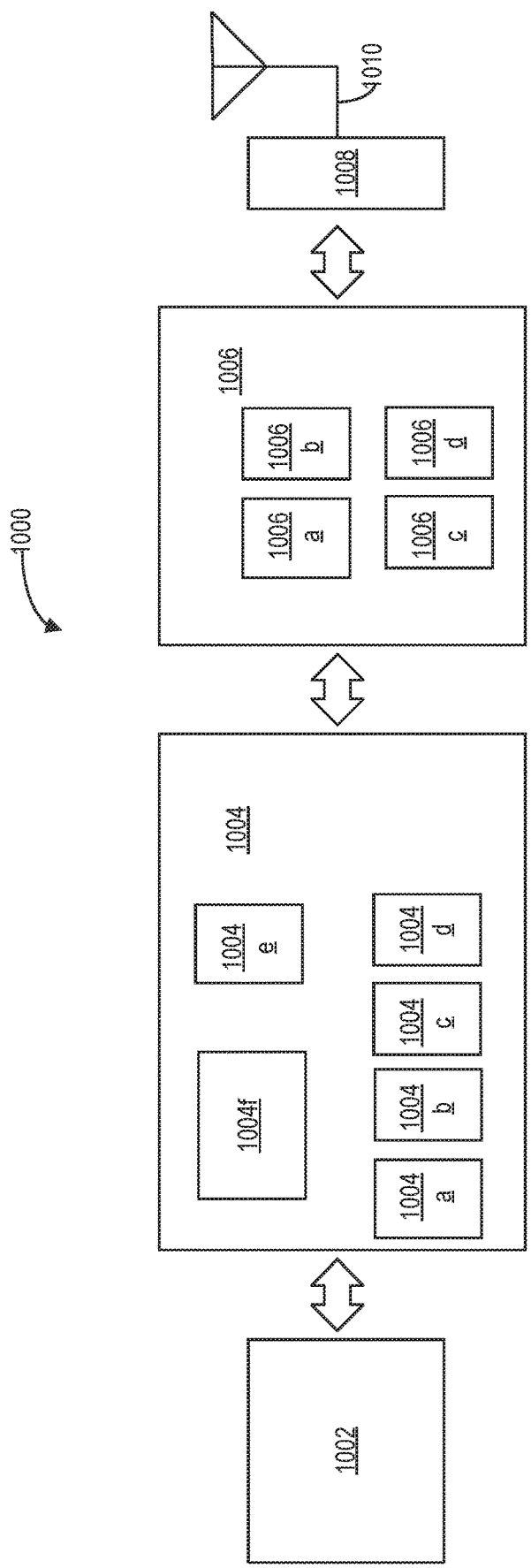
FIG. 10 is a diagram of example components of a wireless device in accordance with one or more embodiments.

Referring now to FIG. 10, example components of a wireless device such as User Equipment (UE) device 110 in accordance with one or more embodiments will be discussed. User equipment (UE) may correspond, for example, to UE 110 of network 100, although the scope of the claimed subject matter is not limited in this respect. In some embodiments, UE device 1000 may include application circuitry 1002, baseband circuitry 1004, Radio Frequency (RF) circuitry 1006, front-end module (FEM) circuitry 1008 and one or more antennas 1010, coupled together at least as shown.

Application circuitry 1002 may include one or more application processors. For example, application circuitry 1002 may include circuitry such as, but not limited to, one or more single-core or multi-core processors. The one or more processors may include any combination of general-purpose processors and dedicated processors, for example graphics processors, application processors, and so on. The processors may be coupled with and/or may include memory and/or storage and may be configured to execute instructions stored in the memory and/or storage to enable various applications and/or operating systems to run on the system.

Baseband circuitry 1004 may include circuitry such as, but not limited to, one or more single-core or multi-core processors. Baseband circuitry 1004 may include one or more baseband processors and/or control logic to process baseband signals received from a receive signal path of RF circuitry 1006 and to generate baseband signals for a transmit signal path of the RF circuitry 1006. Baseband processing circuitry 1004 may interface with the application circuitry 1002 for generation and processing of the baseband signals and for controlling operations of the RF circuitry 1006. For example, in some embodiments, the baseband circuitry 804 may include a second generation (2G) baseband processor 1004a, third generation (3G) baseband processor 1004b, fourth generation (4G) baseband processor 1004c, and/or one or more other baseband processors 1004d for other existing generations, generations in development or to be developed in the future, for example fifth generation (5G), sixth generation (6G), and so on. Baseband circuitry 1004, for example one or more of baseband processors 1004a through 1004d, may handle various radio control functions that enable communication with one or more radio networks via RF circuitry 1006. The radio control functions may include, but are not limited to, signal modulation and/or demodulation, encoding and/or decoding, radio frequency shifting, and so on. In some embodiments, modulation and/or demodulation circuitry of baseband circuitry 1004 may include Fast-Fourier Transform (FFT), precoding, and/or constellation mapping and/or demapping functionality. In some embodiments, encoding and/or decoding circuitry of baseband circuitry 804 may include convolution, tail-biting convolution, turbo, Viterbi, and/or Low Density Parity Check (LDPC) encoder and/or decoder functionality. Embodiments of modulation and/or demodulation and encoder and/or decoder functionality are not limited to these examples and may include other suitable functionality in other embodiments.

In some embodiments, baseband circuitry 1004 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. Processor 1004e of the baseband circuitry 1004 may be configured to run elements of the protocol stack for signaling of the PHY, MAC, RLC, PDCP and/or RRC layers. In some embodiments, the baseband circuitry may include one or more audio digital signal processors (DSP) 1004f. The one or more audio DSPs 1004f may include elements for compression and/or decompression and/or echo cancellation and may include other suitable processing elements in other embodiments. Components of the baseband circuitry may be suitably combined in a single chip, a single chipset, or disposed on a same circuit board in some embodiments. In some embodiments, some or all of the constituent components of baseband circuitry 1004 and application circuitry 1002 may be implemented together such as, for example, on a system on a chip (SOC).

In some embodiments, baseband circuitry 1004 may provide for communication compatible with one or more radio technologies. For example, in some embodiments, baseband circuitry 1004 may support communication with an evolved universal terrestrial radio access network (EUTRAN) and/or other wireless metropolitan area networks (WMAN), a wireless local area network (WLAN), a wireless personal area network (WPAN). Embodiments in which baseband circuitry 804 is configured to support radio communications of more than one wireless protocol may be referred to as multi-mode baseband circuitry.

RF circuitry 1006 may enable communication with wireless networks using modulated electromagnetic radiation through a non-solid medium. In various embodiments, RF circuitry 1006 may include switches, filters, amplifiers, and so on, to facilitate the communication with the wireless network. RF circuitry 1006 may include a receive signal path which may include circuitry to down-convert RF signals received from FEM circuitry 1008 and provide baseband signals to baseband circuitry 1004. RF circuitry 1006 may also include a transmit signal path which may include circuitry to up-convert baseband signals provided by the baseband circuitry 1004 and provide RF output signals to FEM circuitry 1008 for transmission.

In some embodiments, RF circuitry 1006 may include a receive signal path and a transmit signal path. The receive signal path of RF circuitry 1006 may include mixer circuitry 1006a, amplifier circuitry 1006b and filter circuitry 1006c. The transmit signal path of RF circuitry 1006 may include filter circuitry 1006c and mixer circuitry 1006a. RF circuitry 1006 may also include synthesizer circuitry 1006d for synthesizing a frequency for use by the mixer circuitry 1006a of the receive signal path and the transmit signal path. In some embodiments, the mixer circuitry 1006a of the receive signal path may be configured to down-convert RF signals received from FEM circuitry 1008 based on the synthesized frequency provided by synthesizer circuitry 1006d. Amplifier circuitry 1006b may be configured to amplify the down-converted signals and the filter circuitry 1006c may be a low-pass filter (LPF) or band-pass filter (BPF) configured to remove unwanted signals from the down-converted signals to generate output baseband signals. Output baseband signals may be provided to baseband circuitry 1004 for further processing. In some embodiments, the output baseband signals may be zero-frequency baseband signals, although this is not a requirement. In some embodiments, mixer circuitry 1006a of the receive signal path may comprise passive mixers, although the scope of the embodiments is not limited in this respect.

In some embodiments, mixer circuitry 1006a of the transmit signal path may be configured to up-convert input baseband signals based on the synthesized frequency provided by synthesizer circuitry 1006d to generate RF output signals for FEM circuitry 1008. The baseband signals may be provided by the baseband circuitry 1004 and may be filtered by filter circuitry 1006c. Filter circuitry 1006c may include a low-pass filter (LPF), although the scope of the embodiments is not limited in this respect.

In some embodiments, mixer circuitry 1006a of the receive signal path and the mixer circuitry 1006a of the transmit signal path may include two or more mixers and may be arranged for quadrature down conversion and/or up conversion respectively. In some embodiments, mixer circuitry 1006*a* of the receive signal path and the mixer circuitry 1006*a* of the transmit signal path may include two or more mixers and may be arranged for image rejection, for example Hartley image rejection. In some embodiments, mixer circuitry 806*a* of the receive signal path and the mixer circuitry 1006*a* may be arranged for direct down conversion and/or direct up conversion, respectively. In some embodiments, mixer circuitry 1006*a* of the receive signal path and mixer circuitry 1006*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, RF circuitry 1006 may include analog-to-digital converter (ADC) and digital-to-analog converter (DAC) circuitry, and baseband circuitry 804 may include a digital baseband interface to communicate with RF circuitry 1006. In some dual-mode embodiments, separate radio integrated circuit (IC) circuitry may be provided for processing signals for one or more spectra, although the scope of the embodiments is not limited in this respect.

In some embodiments, synthesizer circuitry 1006*d* may be a fractional-N synthesizer or a fractional N/N+1 synthesizer, although the scope of the embodiments is not limited in this respect as other types of frequency synthesizers may be suitable. For example, synthesizer circuitry 1006*d* may be a delta-sigma synthesizer, a frequency multiplier, or a synthesizer comprising a phase-locked loop with a frequency divider.

Synthesizer circuitry 1006*d* may be configured to synthesize an output frequency for use by mixer circuitry 1006*a* of RF circuitry 1006 based on a frequency input and a divider control input. In some embodiments, synthesizer circuitry 1006*d* may be a fractional N/N+1 synthesizer.

In some embodiments, frequency input may be provided by a voltage controlled oscillator (VCO), although that is not a requirement. Divider control input may be provided by either baseband circuitry 1004 or applications processor 1002 depending on the desired output frequency. In some embodiments, a divider control input (e.g., N) may be determined from a look-up table based on a channel indicated by applications processor 1002.

Synthesizer circuitry 1006*d* of RF circuitry 1006 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1, for example based on a carry out, to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1006*d* may be configured to generate a carrier frequency as the output frequency, while in other embodiments, the output frequency may be a multiple of the carrier frequency, for example twice the carrier frequency, four times the carrier frequency, and so on, and used in conjunction with quadrature generator and divider circuitry to generate multiple signals at the carrier frequency with multiple different phases with respect to each other. In some embodiments, the output frequency may be a local oscillator (LO) frequency (fLO). In some embodiments, RF circuitry 1006 may include an in-phase and quadrature (IQ) and/or polar converter.

FEM circuitry 1008 may include a receive signal path which may include circuitry configured to operate on RF signals received from one or more antennas 1010, amplify the received signals and provide the amplified versions of the received signals to the RF circuitry 1006 for further processing. FEM circuitry 1008 may also include a transmit signal path which may include circuitry configured to amplify signals for transmission provided by RF circuitry 1006 for transmission by one or more of the one or more antennas 1010.

In some embodiments, FEM circuitry 1008 may include a transmit/receive (TX/RX) switch to switch between transmit mode and receive mode operation. FEM circuitry 1008 may include a receive signal path and a transmit signal path. The receive signal path of FEM circuitry 1008 may include a low-noise amplifier (LNA) to amplify received RF signals and to provide the amplified received RF signals as an output, for example to RF circuitry 1006. The transmit signal path of FEM circuitry 1008 may include a power amplifier (PA) to amplify input RF signals, for example provided by RF circuitry 1006, and one or more filters to generate RF signals for subsequent transmission, for example by one or more of antennas 1010. In some embodiments, UE device 1000 may include additional elements such as, for example, memory and/or storage, display, camera, sensor, and/or input/output (I/O) interface, although the scope of the claimed subject matter is not limited in this respect.

The following are example implementations of the subject matter described herein. It should be noted that any of the examples and the variations thereof described herein may be used in any permutation or combination of any other one or more examples or variations, although the scope of the claimed subject matter is not limited in these respects. In example one, an apparatus of a user equipment (UE) may comprise circuitry to enter into an evolved universal mobile telecommunications system (UMTS) terrestrial radio access (E-UTRAN) Routing Area Paging Channel (ERA_PCH) state, wherein the UE is configured with an E-UTRAN Routing Area (ERA) comprising a collection of cell identifiers, and an Anchor identifier (Anchor ID) to identify an anchor evolved Node B (eNB) for the UE, reselect to a new cell without performing a handover procedure, and perform a cell update procedure. In example two, the subject matter of example one or any of the examples described herein further may include circuitry to perform the cell update procedure with a cause value indicating an ERA change if the UE reselects to a cell that is not part of the ERA. In example three, the subject matter of example one or any of the examples described herein further may include circuitry to perform the cell update procedure in response to a paging signal. In example four, the subject matter of example one or any of the examples described herein further may include circuitry to perform the cell update procedure if the UE as uplink data for transmission. In example five, the Anchor ID may identify an eNB or an eNB gateway (eNB GW) to buffer data or store a UE context during cell selection. In example six, the subject matter of example one or any of the examples described herein further may comprise the UE to indicate the Anchor ID during the cell update procedure. In example seven, the subject matter of example one or any of the examples described herein further may include circuitry to receive a new Anchor ID during the cell update procedure if the Anchor ID is changed. In example eight, the subject matter of example one or any of the examples described herein further may include circuitry to receive new ERA information comprising a collection of cell identifiers during the cell update procedure if the cell update procedure is triggered by an ERA change. In example nine, the subject matter of example one or any of the examples described herein further may include circuitry to change to a Cell Update Connected (CU_CNCTD) during the update procedure. In example ten, the subject matter of example one or any of the examples described herein further may comprise the ERA to be broadcast by an eNB as an ERA identifier (ERA ID) to the UE as system information.

In example eleven, an apparatus of a user equipment (UE) may comprise circuitry to enter into a Cell Update Connected (CU_CNCTD) state, wherein the UE is configured with an Anchor identifier (Anchor ID) to identify an anchor evolved Node B (eNB) for the UE, reselect to a new cell, perform a cell update procedure, perform a buffer request procedure in response to the UE reselecting to the new cell, and perform a cell update procedure to download buffered data and to perform data transmission with the new cell. In example twelve, the subject matter of example eleven or any of the examples described herein further may comprise the Anchor ID to identify an eNB or an eNB gateway (eNB GW) to buffer data or store a UE context during cell reselection. In example thirteen, the subject matter of example eleven or any of the examples described herein further may comprise the UE to indicate the Anchor ID during the cell update procedure. In example fourteen, the subject matter of example eleven or any of the examples described herein further may include circuitry to receive a new Anchor ID during the cell update procedure if the Anchor ID is changed as part of the cell update procedure or another radio resource control (RRC) procedure.

In example fifteen, one or more computer-readable media may have instructions stored thereon that, if executed by user equipment (UE), result in entering into an evolved universal mobile telecommunications system (UMTS) terrestrial radio access (E-UTRAN) Routing Area Paging Channel (ERA_PCH) state, wherein the UE is configured with an E-UTRAN Routing Area (ERA) comprising a collection of cell identifiers, and an Anchor identifier (Anchor ID) to identify an anchor an evolved Node B (eNB) for the UE, reselecting to a new cell without performing a handover procedure, and performing a cell update procedure in response to the UE reselecting to the new cell, in response to the UE receiving a paging signal, or if the UE has uplink data for transmission. In example sixteen, the subject matter of example fifteen or any of the examples described herein further may include instructions, if executed, to result in performing the cell update procedure with a cause value indicating an ERA change if the UE reselects to a cell that is not part of the ERA. In example seventeen, the subject matter of example fifteen or any of the examples described herein further may include instructions, if executed, to result in the Anchor ID identifying an eNB or an eNB gateway (eNB GW) to buffer data or store a UE context during cell reselection. In example eighteen, the subject matter of example fifteen or any of the examples described herein further may include instructions, if executed, to result in the UE indicating the Anchor ID during the cell update procedure. In example nineteen, the subject matter of example fifteen or any of the examples described herein further may include instructions, if executed, to result in receiving a new Anchor ID during the cell update procedure if the Anchor ID is changed. In example twenty, the subject matter of example fifteen or any of the examples described herein further may include instructions, if executed, to result in receiving new ERA information comprising a collection of cell identifiers during the cell update procedure if the cell update procedure is triggered by an ERA change. In example twenty-one, the subject matter of example fifteen or any of the examples described herein further may include instructions, if executed, to result in the ERA being broadcast by an eNB as an ERA identifier (ERA ID) to the UE as system information.

In example twenty-two, one or more computer-readable media may have instructions stored thereon that, if executed by user equipment (UE), result in entering into a Cell Update Connected (CU_CNCTD) state, wherein the UE is configured with an Anchor identifier (Anchor ID) to identify an anchor evolved Node B (eNB) for the UE, reselecting to a new cell, performing a cell update, performing a buffer request procedure in response to the UE reselecting to the new cell, and performing a cell update procedure to download buffered data and to perform data transmission with the new cell. In example twenty-three, the subject matter of example twenty-two or any of the examples described herein further may include instructions, if executed, to result in the Anchor ID identifying an eNB or an eNB gateway (eNB GW) to buffer data or store a UE context during cell reselection. In example twenty-four, the subject matter of example twenty-two or any of the examples described herein further may include instructions, if executed, to result in the UE indicating the Anchor ID during the cell update procedure. In example twenty-five, the subject matter of example twenty-two or any of the examples described herein further may include instructions, if executed, to result in receiving a new Anchor ID during the cell update procedure if the Anchor ID is changed as part of the cell update procedure or another radio resource control (RRC) procedure.

Although the claimed subject matter has been described with a certain degree of particularity, it should be recognized that elements thereof may be altered by persons skilled in the art without departing from the spirit and/or scope of claimed subject matter. It is believed that the subject matter user equipment controlled mobility in an evolved radio access network and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. User equipment (UE) comprising processing circuitry to:
   enter into a Cell Update Connected (CU_CNCTD) state with a current cell, wherein the UE is configured with an Anchor identifier (Anchor ID) to identify an anchor evolved Node B (eNB) for the UE;
   reselect to a new cell;
   perform a cell update procedure in response to the UE reselecting to the new cell;
   perform a buffer request procedure in the current cell prior to the UE reselecting to the new cell; and perform a cell update procedure in the new cell to resume transmission of buffered data via the new cell based on at least the Anchor ID.

2. The UE as claimed in claim 1, wherein the Anchor ID identifies an eNB or an eNB gateway (eNB GW) to buffer data or store a UE context during cell reselection.

3. The UE as claimed in claim 1, wherein the UE indicates the Anchor ID during the cell update procedure.

4. The UE as claimed in claim 1, comprising processing circuitry to receive a new Anchor ID during the cell update procedure if the Anchor ID is changed as part of the cell update procedure or another radio resource control (RRC) procedure.

5. An article of manufacture comprising a non-transitory medium having instructions stored thereon that, if executed by user equipment (UE), result in:
  entering into a Cell Update Connected (CU_CNCTD) state with a current cell, wherein the UE is configured with an Anchor identifier (Anchor ID) to identify an anchor evolved Node B (eNB) for the UE;
  reselecting to a new cell;
  performing a cell update procedure in response to the UE reselecting to the new cell; performing a buffer request procedure in the current cell prior to the UE reselecting to a new cell; and
  performing a cell update procedure in the new cell to resume transmission of buffered data via the new cell based on at least the Anchor ID.

6. The article of manufacture as claimed in claim 5, wherein the Anchor ID identifies an eNB or an eNB gateway (eNB GW) to buffer data or store a UE context during cell reselection.

7. The article of manufacture as claimed in claim 5, wherein the UE indicates the Anchor ID during the cell update procedure.

8. The article of manufacture as claimed in claim 5, wherein the instructions, if executed, result in receiving a new Anchor ID during the cell update procedure if the Anchor ID is changed as part of the cell update procedure or another radio resource control (RRC) procedure.

9. The article of manufacture as claimed in claim 5, wherein the anchor eNB is one of the current cell or another cell in an E-UTRAN Routing Area including the current cell and the new cell.

10. The UE as claimed in claim 1, wherein the anchor eNB is one of the current cell or another cell in an E-UTRAN Routing Area including the current cell and the new cell.

11. An integrated circuit, comprising:
  circuitry configured to enter into a Cell Update Connected (CU_CNCTD) state with a current cell, wherein the integrated circuit is configured with an Anchor identifier (Anchor ID) to identify an anchor evolved Node B (eNB) for the integrated circuit;
  circuitry configured to reselect to a new cell;
  circuitry configured to perform a cell update procedure in response to reselecting to the new cell;
  circuitry configured to perform a buffer request procedure in the current cell prior to the UE reselecting to the new cell; and
  circuitry configured to perform a cell update procedure in the new cell to resume transmission of buffered data via the new cell based on at least the Anchor ID.

12. The integrated circuit as claimed in claim 11, wherein the Anchor ID identifies an eNB or an eNB gateway (eNB GW) to buffer data or store a context during cell reselection.

13. The integrated circuit as claimed in claim 11, wherein the integrated circuit indicates the Anchor ID during the cell update procedure.

14. The integrated circuit as claimed in claim 1, further comprising:
  circuitry configured to receive a new Anchor ID during the cell update procedure if the Anchor ID is changed as part of the cell update procedure or another radio resource control (RRC) procedure.

15. The integrated circuit as claimed in claim 11, wherein the anchor eNB is one of the current cell or another cell in an E-UTRAN Routing Area including the current cell and the new cell.

* * * * *